Patented Feb. 20, 1940

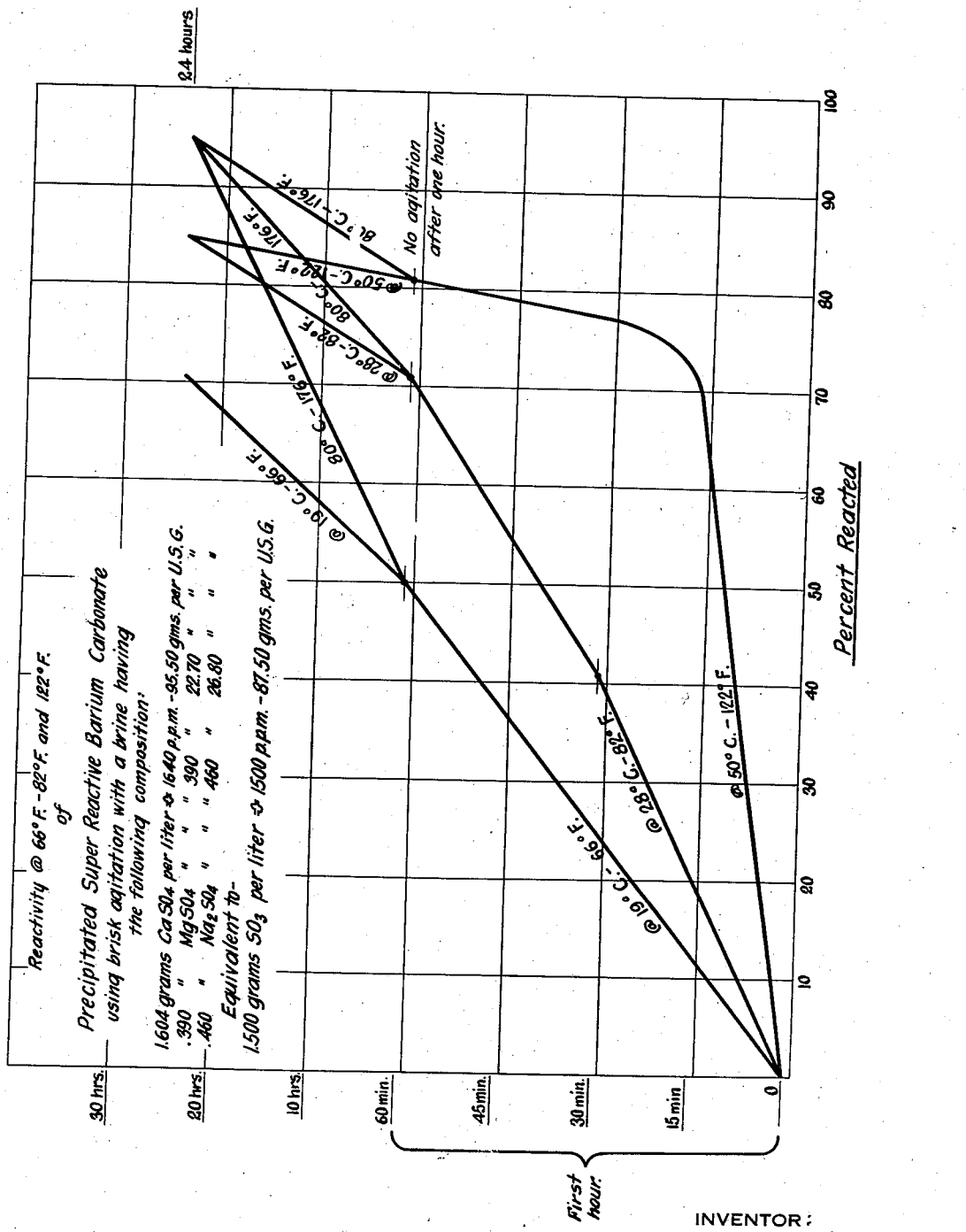

2,191,411

UNITED STATES PATENT OFFICE 2,191,411

METHOD OF PURIFYING BRINES

James B. Pierce, Jr., Charleston, W. Va., assignor to Standard Ultramarine Company, Huntington, W. Va., a corporation of West Virginia Application December 13, 1938, Serial No. 245,412

8 Claims. (Cl. 23—45)

This invention relates to the purifying of brine and other liquors containing as impurities therein water-soluble sulphates and has for its principal objects the provision of a simple, economical, expeditious and effective method for accomplishing such removal.

Natural salt brines usually contain water-soluble sulphates, more especially those of calcium, magnesium and sodium. Heretofore it has been customary, particularly where such brines were intended for use in the manufacture of soda ash, electrolytic caustic and chlorine, to employ barium chloride for the purpose of effecting the removal of the sulphate radical but such treatment, however, is wholly ineffective for the purpose of removing the lime and magnesia radicals. Furthermore, barium chloride, even if it were entirely suitable for the purpose, is relatively costly being some 25% more expensive than barium carbonate, the agent employed by me in the purification method hereinafter described.

Commercial air-floated witherite i. e. natural barium carbonate, has an average particle size of about 2.55 microns and a specific surface of 0.547 sq. meter per gram and even precipitated barium carbonate prepared in accordance with the method described in my prior Patent No. 1,774,523 has an average particle size of some 0.444 micron and a specific surface of some 3.145 sq. meters per gram. Such products of other barium carbonates are of relatively large particle size and relatively small specific surface as compared with the super-reactive barium carbonate employed by me in the method hereinafter described and are not adapted for the successful purification of salt brine solutions since they are not sufficiently reactive to effectively remove lime and magnesium radicals from the brine.

My investigations have led to the discovery that the super-reactive barium carbonate, hereinafter described, is ideally adapted for the purification of brine solutions since the same, due to its high reactivity, is capable of completely removing from the brine liquor the lime radical and also of substantially completely removing the magnesia radical so that but a trace of the same remains in such liquor, while at the same time effecting such a complete removal of the sulphate that but about 20 parts per million of the same (calculated as $SO_3$), remain in such solution. In the event such small amount of sulphate radical cannot be tolerated by the manufacturer, the same can be eliminated by the addition of a chemical equivalent amount of barium chloride following the herein described treatment with super reactive barium carbonate.

The theoretical explanation of the effectiveness of the super reactive barium carbonate employed by me for effecting the removal of the sulphate, lime and magnesia radicals from salt brines can be best appreciated by reference to the following reactions:

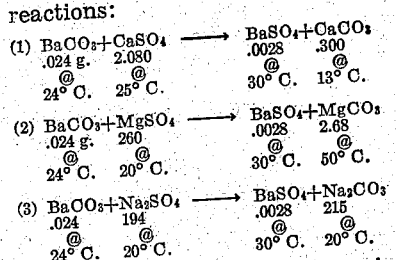

The figures under the chemical symbols are solubilities in water of the compound represented by the symbol in grams per liter at the temperature indicated, as given in Seidell's solubility tables.

These solubilities, as given, do not of course take into consideration the effect on the solubilities of the various compounds caused by the nearly saturated salt solution instead of water; however, the controlling factor that causes Reactions 1, 2 and 3 to proceed to completion towards the right is the fact that barium sulphate is 8½ times more insoluble in water than barium carbonate, and we can with assurance reason that this differential in solubilities will not be materially altered by the saturated salt solution.

Seidell gives the solubility of $MgCO_3$ in a 25% salt solution in contact with air as .923 gram per liter, instead of the 2.68 grams for water. This will of course cause Reaction 2 to proceed to practical completion to the right and explains why we find only a trace of magnesium in the purified salt brine.

Seidell gives the solubility of $CaCO_3$ in a 25% salt solution in contact with air as .085 gram per liter, instead of the .300 gram for water. This will of course cause Reaction 1 to proceed to practical completion to the right.

Both $Na_2CO_3$ and $Na_2SO_4$ are so soluble in either water or a 25% salt solution that Reaction 3 depends for its driving force to the right altogether on the insolubility of $BaSO_4$ as compared with barium carbonate, but as $BaCO_3$ is relatively insoluble a time element enters here to complete the removal of the $SO_3$ equivalent of the $Na_2SO_4$.

The accompanying drawing is a graph of the reactivity at the temperatures specified of the aforesaid super-reactive barium carbonate employed by me in the purification of brines with a brine containing calcium, magnesium and sodium sulphate in an amount equivalent to 1.500 gms. $SO_3$ per liter.

As contrasted to the reactivity of the aforesaid super reactive barium carbonate towards calcium, magnesium and sodium sulphate, the appended table illustrates the reactivity of barium carbonate prepared in accordance with the method described in Patent No. 1,774,523 (designated #1) and which has an average particle size of 0.444 micron and a specific surface of 3.145 sq. meters per gram, representing 5.07 trillion particles per gram, also the barium carbonate prepared in accordance with the method described in Patent No. 1,634,338 (designated #2) and which has an average particle size of 0.812 micron and a specific surface of 1.72 sq. meters per gram, representing 0.83 trillion particles per gram; and also commercial air-floated witherite i. e. natural barium carbonate (designated #3) which has an average particle size of 2.55 microns and a specific surface of 0.547 sq. meter per gram, representing 0.027 trillion particles per gram. In such table the concentrations of the calcium, magnesium and sodium sulphate solutions are 0.0021018 gram per ml., 0.0017874 gram per ml. and 0.0020168 gram per ml. respectively.

The aforesaid super reactive barium carbonate having an average particle size of considerably less than 4 microns desirably about 0.234 micron and a specific surface considerably greater than 4 sq. meters per gram and desirably about 6 sq. meters per gram or corresponding to about 36.2 trillion particles per gram is preferably prepared as follows:

4500 ml. (milliliters) of a barium sulphide liquor heated to between 60° C. and 90° C. and of about 9.5% BaS content is introduced into a cylindrical container or absorber of a turbo mixer, such for example as the Gabbett mixer illustrated in Patent No. 835,120 or the turbo mixer illustrated in Patent No. 2,081,112, said container preferably being of a capacity of 10,000 ml. Approximately 20% by volume of carbon dioxide gas is then introduced into the absorber while the liquor is being rapidly agitated therein by means of the turbine wheel thereof so that the gas discharges in close proximity to such wheel and preferably discharges immediately below a baffling dome mounted immediately above such wheel. The degree of agitation of the liquor in the mixer and the rate of introduction of the gas thereinto is desirably sufficient to convert the mixture into a fine mist, for example at the rate of 2 cubic feet per minute when the turbine wheel is rotating at about 1500 R. P. M. Following the completion of the reaction, the resultant super reactive barium carbonate is washed with water, filtered and dried.

*Reactivity table of the aforesaid barium carbonates #1, #2 and #3*

| Percent reacted between— | Barium carbonate | | |
|---|---|---|---|
| | #1 | #2 | #3 |
| | Percent | Percent | Percent |
| Calcium sulfate: | | | |
| In 15 minutes | 15.0 | 4.6 | 6.05 |
| 30 minutes | 37.0 | 10.6 | 11.2 |
| 60 minutes | 90.5 | 30.1 | 21.8 |
| Magnesium sulfate: | | | |
| In 15 minutes | 29.9 | 24.5 | 18.1 |
| 30 minutes | 34.9 | 28.9 | 20.5 |
| 60 minutes | 40.4 | 34.4 | 24.3 |
| Sodium sulfate: | | | |
| In 15 minutes | 45.5 | 34.4 | 21.1 |
| 30 minutes | 49.6 | 37.1 | 24.0 |
| 60 minutes | 56.0 | 40.3 | 26.8 |

In order to accomplish the purification of salt brines containing water-soluble sulphates, such for example as those of calcium, magnesium and sodium, it is merely necessary to admix with the brine solutions the chemical equivalent of such super barium carbonate, the same being added thereto in dry form while vigorously agitating the mixture either mechanically or pneumatically or by pressure circulation thereof. The said super reactive barium carbonate will precipitate the sulphate radical of the water-soluble sulphates present in the mixtures as barium sulphate and will precipitate the lime and magnesia radicals as calcium carbonate and magnesium carbonate respectively.

Preferably the brine is heated to a temperature of from 19° C. to 50° C. while being vigorously agitated as aforesaid during the first hour, whereupon the agitation is discontinued and the temperature raised to approximately 80° C. at which temperature the reaction is allowed to continue for an additional 24 hours. Following the completion of the reaction the precipitated products are allowed to settle and the clear liquor is then decanted off therefrom or, if desired, in lieu of such decantation, the purified brine can be separated by filtration from the precipitated barium sulphate together with carbonates of calcium, and magnesium.

Various modifications both as regards the physical dimensions of the particles of the super reactive barium carbonate employed in the above described method of treating salt brines, as well as in the temperature maintained during the treatment and the time of agitation, as well as the time of total treatment, within the scope of the appended claims, may be made without departing from the spirit of my invention.

Having thus described my invention, what I claim and desire to obtain by United States Letters Patent is:

1. The method of purifying salt brines and other liquors containing a plurality of water-soluble sulphates, including calcium or magnesium sulphate as impurities, which comprises agitating the same with an amount of a precipitated super-reactive barium carbonate which is at least about the chemical equivalent by weight of a water-soluble sulphate present in the liquor and which barium carbonate has been dried subsequently to such precipitation and has a particle size of less than 0.35 micron and is of a specific surface of at least about 4.5 sq. meters per gram; and then separating the resultant precipitate from the liquor of the mixture.

2. The method of purifying salt brines and other liquors containing a plurality of water-soluble sulphates, including calcium or magnesium sulphate as impurities, which comprises agitating the same with an amount of a precipitated super-reactive barium carbonate which is at least about the chemical equivalent by weight of a water-soluble sulphate present in the liquor and which barium carbonate has been dried subsequent to such precipitation and has a particle size of less than 0.3 micron and is of a specific surface of at least about 5 sq. meters per gram; and then separating the resultant precipitate from the liquor of the mixture.

3. The method of purifying salt brines and other liquors containing a plurality of water-soluble sulphates, including calcium or magnesium sulphate as impurities, which comprises agitating the same for a relatively short period, not exceeding a few hours and while the same is at a temperature between about 60° C. and 15° C., with an amount of a precipitated super-reactive barium carbonate which is at least about the chemical equivalent by weight of a water-soluble sulphate present in the liquor and which barium carbonate has been dried subsequent to such precipitation and has a particle size of less than 0.35 micron and is of a specific surface of at least about 4.5 sq. meters per gram, then discontinuing such agitation and while the liquor is substantially quiescent, maintaining the liquor at a temperature in excess of 75° C. for a prolonged period of time and several times the original period of agitation to effect completion of the reaction of such barium carbonate on the soluble sulphates, and then separating the resultant precipitate from the liquor of the mixture.

4. The method of purifying salt brines and other liquors containing a plurality of water-soluble sulphates, including calcium or magnesium sulphate as impurities, which comprises agitating the same for a relatively short period, not exceeding a few hours and while the same is at a temperature between about 60° C. and 15° C., with an amount of a precipitated super-reactive barium carbonate which is at least about the chemical equivalent by weight of a water-soluble sulphate present in the liquor and which barium carbonate has been dried subsequent to such precipitation and has a particle size of less than 3 microns and is of a specific surface of at least about 5 sq. meters per gram, then discontinuing such agitation and while the liquor is substantially quiescent, maintaining the liquor at a temperature in excess of 75° C. for a prolonged period of time and several times the original period of agitation to effect completion of the reaction of such barium carbonate on the soluble sulphates; and then separating the resultant precipitate from the liquor of the mixture.

5. In the method as claimed in claim 4, wherein the period of agitation is less than 2 hours and the period of treatment while the liquor is quiescent exceeds 20 hours.

6. In the method as claimed in claim 4, wherein the period of agitation approximates 1 hour and the subsequent period of treatment while the liquor is quiescent is at least about 24 hours.

7. The method of purifying salt brines and other liquors containing a plurality of water-soluble sulphates, including calcium or magnesium sulphate as impurities, which comprises agitating the same for a relatively short period, not exceeding a few hours and while the same is at a temperature between about 60° C. and 15° C., with an amount of a precipitated super-reactive barium carbonate which is at least about the chemical equivalent by weight of a water-soluble sulphate present in the liquor and which barium carbonate has been dried subsequent to such precipitation and has a particle size of less than 0.25 micron and is of a specific surface of at least about 5 sq. meters per gram, then discontinuing such agitation and while the liquor is substantially quiescent, maintaining the liquor at a temperature in excess of 75° C. for a prolonged period of time and several times the original period of agitation to effect completion of the reaction of such barium carbonate on the soluble sulphates; and then separating the resultant precipitate from the liquor of the mixture.

8. The method of purifying salt brines and other liquors containing a plurality of water-soluble sulphates, including calcium or magnesium sulphate as impurities, which comprises agitating the same with an amount of a precipitated super-reactive barium carbonate which is at least about the chemical equivalent by weight of a water-soluble sulphate present in the liquor and which barium carbonate has a particle size of less than 0.25 micron and is of a specific surface of at least about 5 sq. meters per gram; and then separating the resultant precipitate from the liquor of the mixture.

JAMES B. PIERCE, Jr.